United States Patent
Maruyama

(10) Patent No.: US 7,122,975 B2
(45) Date of Patent: Oct. 17, 2006

(54) FILAMENT LAMP LIGHT QUANTITY CONTROL METHOD AND FILAMENT LAMP LIGHT QUANTITY CONTROL UNIT AND FILAMENT LAMP LIGHT SOURCE UNIT

(75) Inventor: Fumio Maruyama, Saitama (JP)

(73) Assignee: Sumita Optical Glass, Inc., Saitama (JP)

( * ) Notice: Subject to any disclaimer, the term of this patent is extended or adjusted under 35 U.S.C. 154(b) by 0 days.

(21) Appl. No.: 11/185,321

(22) Filed: Jul. 20, 2005

(65) Prior Publication Data
US 2006/0066262 A1    Mar. 30, 2006

Related U.S. Application Data

(63) Continuation-in-part of application No. 10/954,547, filed on Sep. 30, 2004, now abandoned.

(51) Int. Cl.
G05F 1/00    (2006.01)
(52) U.S. Cl. .................... 315/308; 315/307; 315/291
(58) Field of Classification Search ........ 315/307–308, 315/291, 299–301
See application file for complete search history.

(56) References Cited

U.S. PATENT DOCUMENTS

| | | | | |
|---|---|---|---|---|
| 3,821,601 A | * | 6/1974 | Kappenhagen et al. ..... | 315/311 |
| 3,890,537 A | * | 6/1975 | Park et al. ................... | 315/208 |
| 3,967,159 A | * | 6/1976 | Dendy et al. ............... | 315/247 |
| 4,156,166 A | * | 5/1979 | Shapiro et al. ......... | 315/209 R |
| 5,585,699 A | * | 12/1996 | Schulz ....................... | 315/293 |
| 5,872,429 A | * | 2/1999 | Xia et al. ................... | 315/194 |
| 2003/0001522 A1 | * | 1/2003 | Newman et al. ............ | 315/291 |
| 2004/0036422 A1 | | 2/2004 | Maruyama ............... | 315/169.3 |

FOREIGN PATENT DOCUMENTS

| | | |
|---|---|---|
| JP | 57-13528 | 1/1982 |
| JP | 2002-157029 | 5/2002 |
| JP | 2003-187988 | 7/2003 |

* cited by examiner

*Primary Examiner*—Hoanganh Le
*Assistant Examiner*—Tung Le
(74) *Attorney, Agent, or Firm*—Knobbe Martens Olson & Bear LLP

(57) ABSTRACT

The invention relates to a light source unit control method and a light source control unit, and a light source unit comprising a filament lamp with a characteristic of having a light quantity changing almost in proportion to a control voltage, which comprise: a current detection sensor connected in series to the lamp; a multiplication circuit for generating a voltage $V_w$ proportionate to the product of a terminal voltage V of the lamp and an output voltage $V_1$ of said current detection sensor; a multiplication circuit for generating a voltage $V_{ww}$ proportionate to the square root of said voltage $V_w$; an error amplifier circuit for controlling an error to the minimum by comparing the output voltage $V_{ww}$ of said multiplication circuit and the control voltage $V_1$ and a constant voltage power source unit for supplying an electric power to the filament lamp, the unit being connected to an output terminal of the error amplifier circuit, wherein the light quantity of the lamp is controlled by controlling the control voltage.

12 Claims, 9 Drawing Sheets

The present invention

The present invention

A conventional lamp driving circuit

*The present invention*

A control circuit of the present invention
(Halogen lamp rated 100W)

A control circuit of the present invention
(Halogen lamp rated 150W)

FILAMENT LAMP LIGHT QUANTITY CONTROL METHOD AND FILAMENT LAMP LIGHT QUANTITY CONTROL UNIT AND FILAMENT LAMP LIGHT SOURCE UNIT

CROSS-REFERENCE TO RELATED APPLICATIONS

This is a continuation-in-part of U.S. patent application Ser. No. 10/954,547, filed Sep. 30, 2004, now abandoned the disclosure of which is incorporated herein by reference in its entirety.

BACKGROUND OF THE INVENTION

1. Field of the Invention

The present invention relates to a control method of a light source unit comprising a filament lamp, a light source control unit and a light source unit, and more particularly, to a control method of a light source unit comprising a filament lamp with a characteristic of having a light quantity changing almost in proportion to a control voltage, and a light source control unit, and a light source unit.

2. Description of the Related Art

As a light source unit where the illuminance of the filament lamp is changed, it is a commonly used method to employ a voltage stabilizer in the light source unit comprising a filament lamp. FIG. 2 shows the simplest method in which a control voltage 1Vc changes an applied voltage 5V of the lamp so that a luminous flux 8 Lm of the filament lamp is changed.

Continuing with FIG. 2, the voltage 5V applied to the lamp is proportionate to the voltage of the control voltage 1 Vc, and the voltage applied to the lamp at the maximum control voltage is set in such a manner that it becomes a rated voltage of the lamp. Although such a light source unit is priced moderately, it has a drawback in that an illuminance Lx of the lamp for the control voltage 1Vc is nonlinear with the light quantity thereof changed exponentially as shown in the drawing FIG. 3, and a fine adjustment of setting it to a predetermined light quantity is difficult to perform.

On the other hand, in order to change the illuminance of this lamp in proportion to the control voltage, there are two methods conceivable. One method is to turn an inverse transformation corresponding to the nonlinearity of the light quantity for the control voltage into the control voltage. The other method is to feed back the light quantity and make a monitor light proportionate to the control voltage. These methods, however, make the units complicated, thereby making it difficult to manufacture the control units at a moderate price.

SUMMARY OF THE INVENTION

The present invention is to establish a power source control method of a light source in which the light quantity of the lamp is put into a proportional relationship with the control voltage, and to provide a light source control method particularly easy to adjust and available at a low price, and the control unit and light source unit thereof.

Shown in FIG. 4 is a basic block diagram for explaining a basic principle of the present invention.

The diagram is constituted by a control voltage $1V_C$ and a constant multiplication electric power source unit 16 which supplies an electric power to the lamp of which power consumption W is subjected to a equation below $$W^2 = a \times V_C$$

By this constitution, it is possible to allow the luminous flux 10 Lm of the lamp to be proportionate to the control voltage $1V_C$.

Assuming that the rated voltage, rated electric power and rated luminous flux of the lamp are generally taken as $V_o$, $W_o$, and $Lm_o$, respectively, the power consumption W and the luminous flux Lm for the applied voltage V of the filament lamp are represented by:

$$\frac{W}{W_o} = \left[\frac{V}{V_o}\right]^{1.54}, \quad \frac{Lm}{Lm_o} = \left[\frac{V}{V_o}\right]^{3.19} \tag{1}$$

When a voltage ratio of the lamp is deleted from both equations of the equation (1), the following equations are given:

$$\frac{Lm}{Lm_o} = \left[\frac{W}{W_o}\right]^{2.07} \tag{2.a}$$

$$\approx \left[\frac{W}{W_o}\right]^2 \tag{2.b}$$

and a luminous flux ratio of the lamp for a rated value becomes a value close to the second power of an electric power ratio consumed by the lamp. FIG. 5 shows a relationship of the square of the power consumption and an illuminance, and shows a measurement data by a halogen lamp having the electric power of a rated 150 W where the square of the power consumption of the lamp is shown in the axis of abscissas and the illuminance Lx of the lamp is shown in the axis of ordinate. A solid line denotes an actual measurement value, and a dotted line denotes a theoretical value of the equation (2.b). Continuing with FIG. 5, the closer an approximate equation of the equation (2.b) is to a straight line of the broken line, the more faithfully it reproduces an emission characteristic of the light of the lamp. It is conceivable from the graph of FIG. 5 that even when the emission characteristic of the lamp is represented by the approximate equation of the dotted line of the equation (2.b), though there arise a few errors, it is still endurable for a practical use.

A basic principle and means capable of lightening the filament lamp in proportionate to the control voltage will be described with reference to FIG. 4 by using the emission characteristic of the physical light of the filament lamp (the luminous flux is proportionate to the square of the power consumption) and an electronic circuit of the conventional art.

In the constant multiplication electric power source unit 16 shown in FIG. 4, the control voltage $V_C$ corresponding to the rated electric power $W_o$ of the lamp is taken as $V_{Cf}$ and the power supply is taken as zero when the control voltage $V_C$ is zero. This constant multiplication electric power source unit 16 is proportionate to the square of the control voltage $V_C$ and supplies the electric power to the lamp. Hence the lump consumption power for the control voltage $V_C$ and $V_{Cf}$ is represented by the following equation:

$$W^2 = a \cdot V_c, \quad W_o^2 = a \cdot V_{cf} \tag{3}$$

Hence when the equation (3) is substituted for the equation (2a) and the equation (2a) is represented by the control voltage $1V_C$, the following equation is given;

$$Lm \approx Lm_0 \times \left[\frac{W}{W_0}\right]^2 = Lm_0 \times \frac{V_c}{V_{cf}}, \; 0 \le V_c \le V_{cf} \quad (4)$$

Hence, when the lamp is driven by the circuit constitution of the block diagram shown in FIG. 4, the luminous flux 8 Lm of the lamp is substantially proportionate to the change in the control voltage $V_C$.

In the filament lamp light quantity control method of controlling the light quantity of the filament lamp, the present invention is characterized by comprising a current detection sensor connected in series to the filament lamp having a characteristic in which a change in the light quantity of the lamp is substantially proportionate to the square of the power consumption, a multiplication circuit for generating a voltage $V_w$ proportionate to the product of a terminal voltage V of the filament lamp and an output voltage $V_i$ of the current detection sensor, a multiplication circuit for generating a voltage $V_{ww}$ proportionate to the square of said voltage $V_w$, an error amplifier circuit for controlling an error to the minimum by comparing the output voltage $V_{ww}$ of said multiplication circuit and the control voltage Vc and an constant voltage source unit for supplying an electric power to the filament lamp, the unit being connected to the output terminal of the error amplifier circuit, wherein the light quantity of the filament lamp is controlled by controlling the control voltage.

In the filament lamp light quantity control method of controlling the light quantity of the filament lamp, the present invention is characterized in that a current detection resistor R constitutes the current detection sensor.

In the filament lamp light quantity control unit for controlling the light quantity of the filament lamp, the present invention is characterized by comprising a current detection sensor connected in series to the filament lamp having a characteristic in which a change in the light quantity of the lamp is proportionate to the square of the power consumption, a multiplication circuit for generating a voltage $V_w$ proportionate to the product of a terminal voltage V of the filament lamp and an output voltage $V_i$ of the current detection sensor, a multiplication circuit for generating a voltage $V_{ww}$ proportionate to the square of said voltage $V_w$; an error amplifier circuit for controlling an error to the minimum by comparing the output voltage $V_{ww}$ of said multiplication circuit and the control voltage $V_C$ and a constant voltage source unit for supplying an electric power to the filament lamp, the unit being connected to the output terminal of the error amplifier circuit.

In the filament lamp light quantity control unit for controlling the light quantity of the filament lamp, the present invention is characterized in that a current detection resistor R constitutes the current detection sensor.

In the filament lamp light source unit, the present invention is characterized by comprising a filament lamp having a characteristic in which a change in the light quantity of the lamp is almost proportionate to the square of the power consumption, a current detection sensor connected in series to the filament lamp, a multiplication circuit for generating a voltage $V_w$ proportionate to the product of a terminal voltage V of the filament lamp and an output voltage $V_i$ of the current detection sensor, a multiplication circuit for generating a voltage $V_{ww}$ proportionate to the square of the said voltage $V_w$, an error amplifier circuit for controlling an error to the minimum by comparing the output voltage $V_w$ of the multiplication circuit and the output voltage $V_{ww}$ of said multiplication and the control voltage Vc and a constant voltage source unit for supplying an electric power to the filament lamp, the unit being connected to the output terminal of the error amplifier circuit.

In the filament lamp light source unit, the present invention is characterized in that a current detection resistor R constitutes the current detection sensor.

In the filament lamp light quantity control method, the present invention is characterized in that the filament lamp is taken as a halogen lamp.

In the filament lamp light quantity control unit, the present invention is characterized in that the filament lamp is taken as the halogen lamp.

In the filament lamp light source unit, the present invention is characterized in that the filament lamp is taken as the halogen lamp.

In the filament lamp light source unit, the present invention is characterized in that the filament lamp is taken as the halogen lamp and, at the same time, the current detection register R is taken as 0.01 Ohm.

In a microscopic halogen lamp light source unit for controlling the light quantity of the halogen lamp, the present invention is characterized by comprising a halogen lamp having a characteristic in which a change in a light quantity is substantially proportionate to the square of the power consumption, a current detection sensor connected in series to the lamp, a multiplication circuit for generating a voltage $V_w$ proportionate to the product of a voltage V of the lamp and an output voltage $V_i$ of the current detection sensor, a multiplication circuit for generating a voltage $V_{ww}$ proportionate to the square of the voltage $V_w$, an error amplifier circuit for controlling an error to the minimum by comparing the output voltage $V_{ww}$ of said multiplication circuit and the control voltage Vc, and a constant voltage source unit for supplying an electric power to the lamp, the unit being connected to the output terminal of the error amplifier circuit.

In the microscopic halogen lamp light source unit for controlling the light quantity of the halogen lamp, the present invention is characterized in that a current detection resistor R constitutes the current detection sensor.

Shown in FIG. 1 is a block diagram of the present invention, more specifically constituted, based on the basic principle explanatory block diagram shown in FIG. 4.

The block is constituted by a current detection sensor connected in series to the filament lamp, a multiplication circuit for generating a voltage $V_w$ proportionate to the product of a voltage V of the lamp and an output voltage $V_i$ of the current detection sensor, a multiplication circuit for generating a voltage $V_{ww}$ proportionate to the square of the said voltage V w and a constant voltage source unit for supplying the electric power being connected to the output terminal of the error amplifier circuit.

In this circuit, the lamp current I is converted to the voltage $V_i$ proportionate to the lamp current by the detection sensor, $V_{ww}$ is proportionate to the square of power consumption of the filament lamp through two multiplication circuit 11 and 13. from the filament voltage V and the said Vi and the square of the power consumption of the filament lamp is controlled by the error amplifier 2 through the constant voltage source 4 to be balance between the control voltage $V_c$ and the $V_{ww}$ proportionate to the square of the power consumption of the filament lamp.

Now, the square of the power consumption of the filament lamp is subjected by the control voltage Vc. By the equation (2.b), the luminous flux Lm which is the intensity of light from the filament is subjected by the square of the power consumption of the filament lamp linearly. Then the illuminance of this lamp is in proportion to the control voltage $V_c$.

$$Lm = Lm_o \left(\frac{W}{W_o}\right)^2$$

Figure 6:
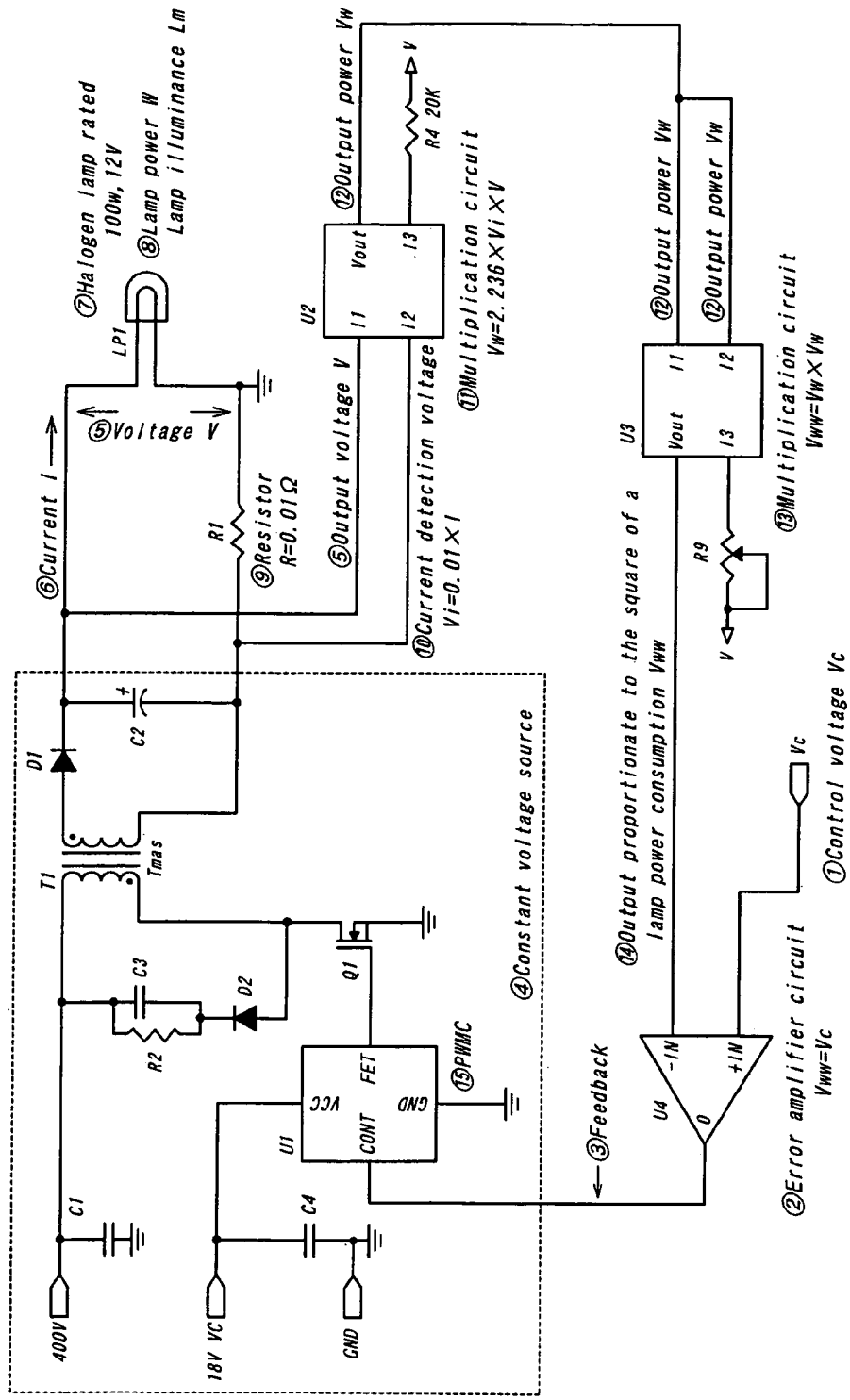
Figure 7:
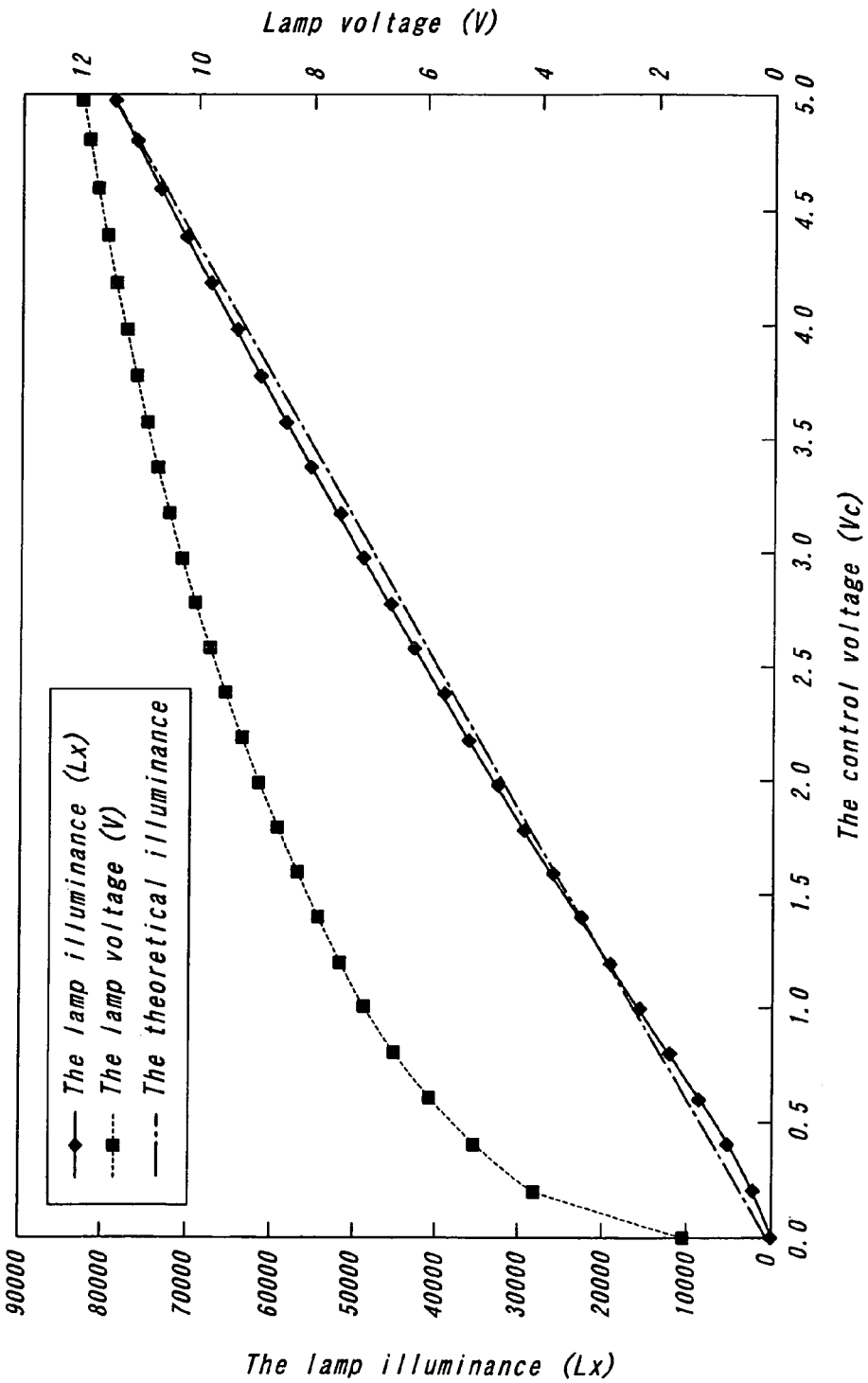

FIG. 6 is a control circuit of the present invention (halogen lamp rated 100 W);

FIG. 7 is a graph showing the light quantity of the lamp and a lamp voltage for a control voltage when the halogen lamp rated 100 W is driven in FIG. 6, in which the axis of abscissas shows the control voltage, the left axis of ordinate shows the lamp illuminance (luxes or Lx), and the right axis of ordinate shows the lamp voltage, the solid line indicates the change in the lamp light quantity for the control voltage $V_C$, and the broken line shows the lamp voltage and the chain line shows a theoretical value equation (13) of the lamp light quantity for the first control voltage.

Figure 8:
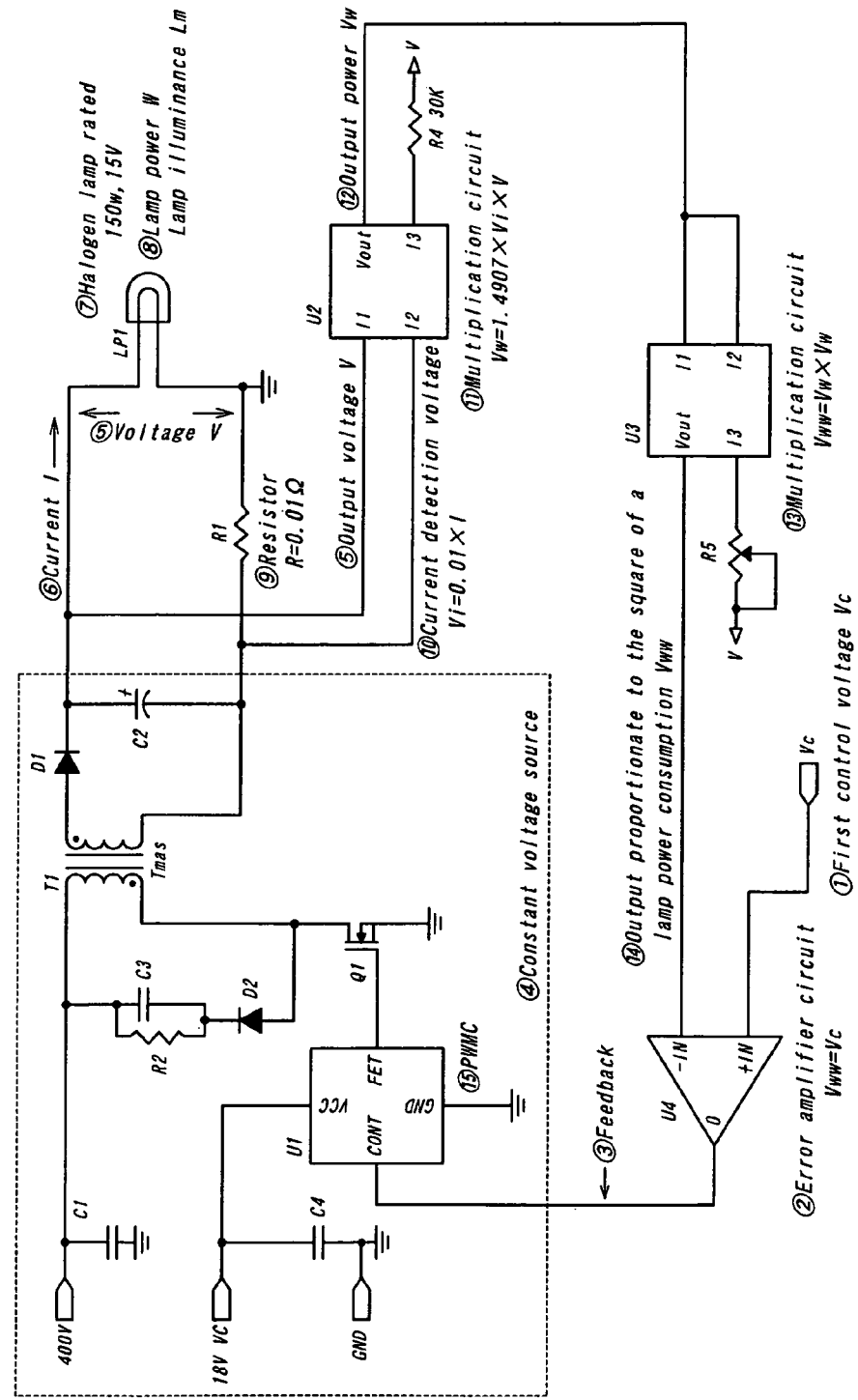
Figure 9:
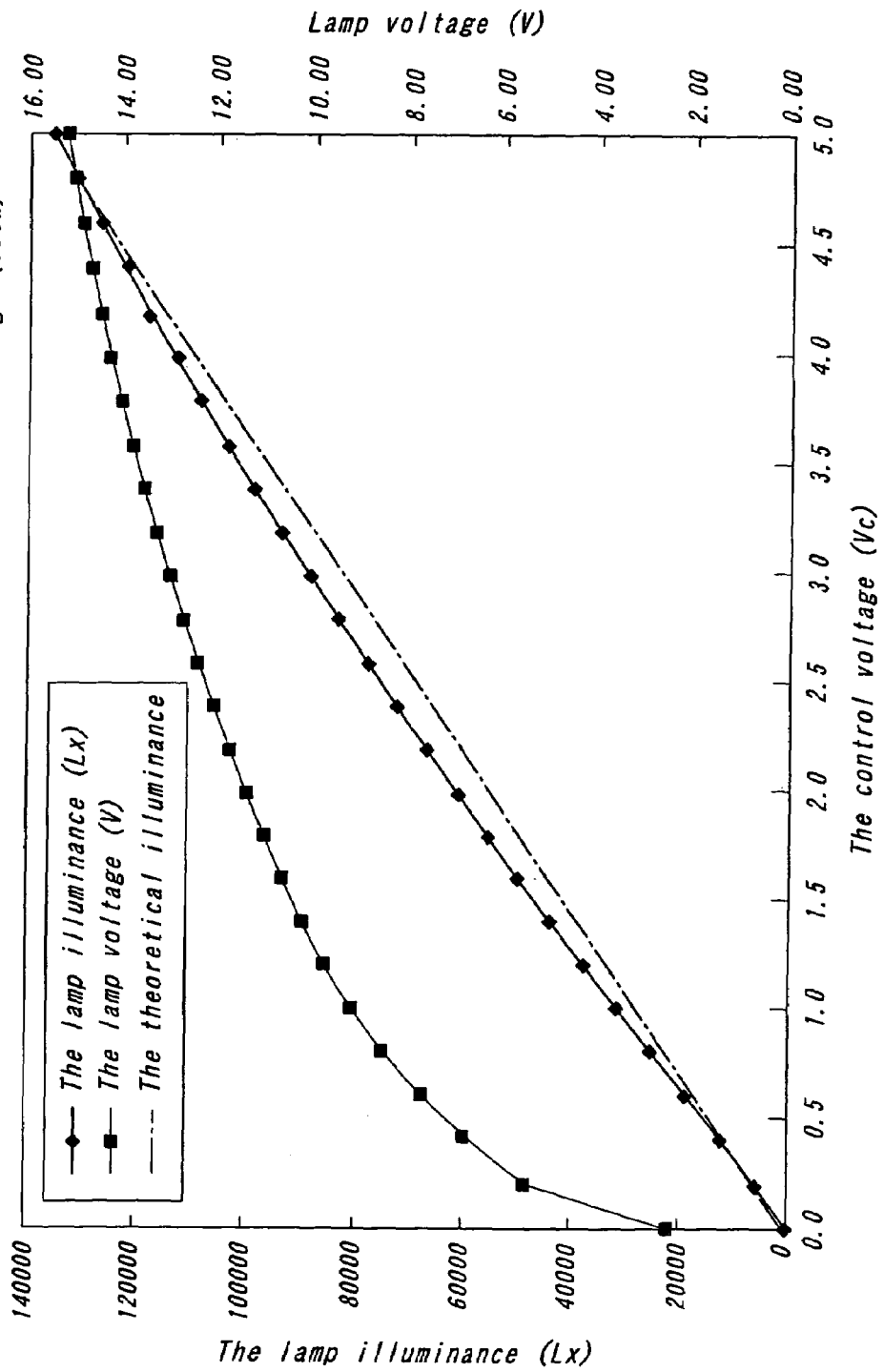

FIG. 8 is the control circuit of the present invention (halogen lamp rated 150 W);

FIG. 9 is a graph showing the lamp light quantity and the lamp voltage for the control voltage when the halogen lamp rated 150 W is driven in FIG. 8, in which the axis of abscissas shows the control voltage, the left axis of ordinate shows the lamp illuminance (luxes or Lx), the right axis of ordinate shows the lamp voltage, the solid line shows the change in the lamp light quantity for the control voltage $V_C$, the broken line shows the lamp voltage.

DETAILED DESCRIPTION OF THE PREFERRED EMBODIMENTS

First Embodiment

FIG. 6 shows a first embodiment of the present invention.

Figure 1:
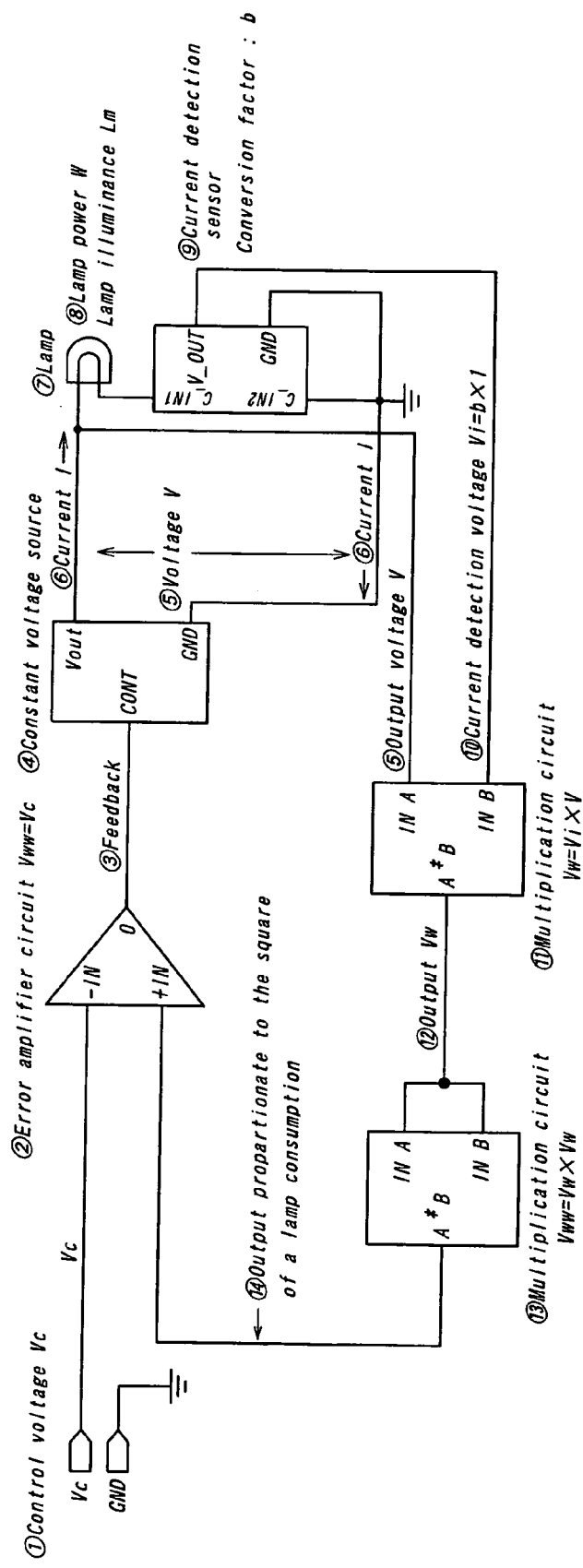
FIG. 1 is a block diagram of the present invention.
Figure 2:
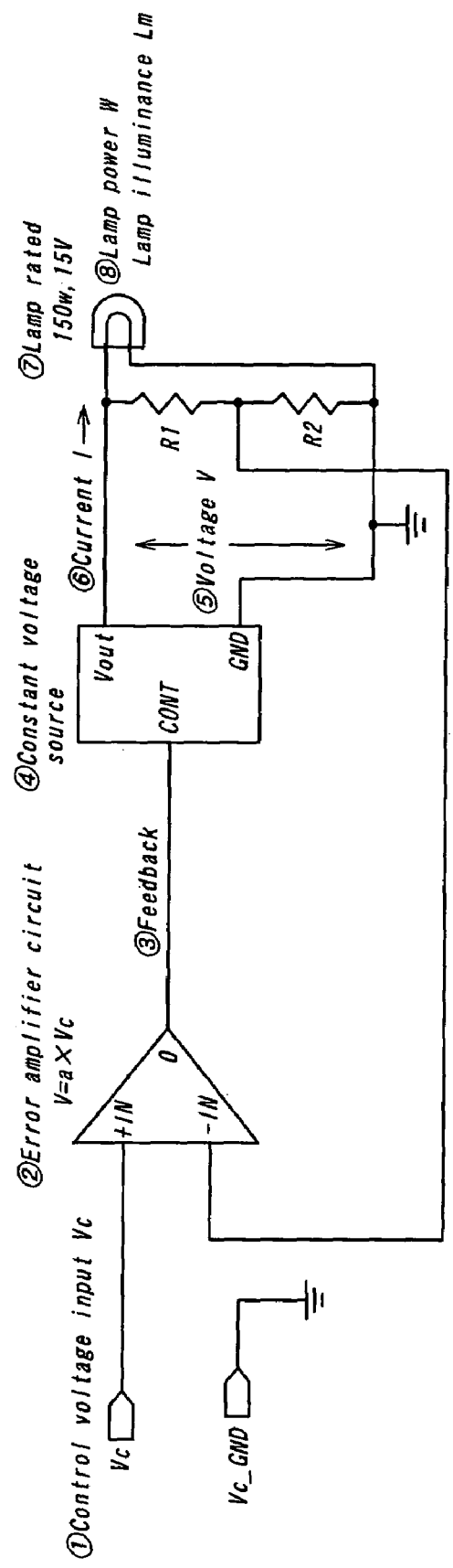
FIG. 2 is a conventional lamp driving circuit.

FIG. 6 shows the constitution of the light quantity control unit shown in the block diagram of FIG. 1, where a halogen lamp rated 100 W, 12V is used. Continuing with FIG. 6, a voltage 5V applied to the lamp from a constant voltage power source unit 4 generates a current 6I, which passes through a lamp and a resistor 9R (0.01 Ohm), which is a current detection sensor and flows back to the constant voltage source unit. At this time, an electric power 8 W consumed in the lamp is represented by the following equation:

$$W = I \times V \quad (5)$$

This electric power is transformed into a light, and is discharged into the space. The relationship between the power consumption of the lamp and the light intensity from the lamp thereof is approximated to the equation (2.a).

The current 6I flowing into the lamp is converted to a current detection voltage $10V_i (=R \times I=0.01 \cdot I)$ by the current detection resistor 9R (0.01 Ohm), and a voltage $12V_w$ proportionate to the product of the current detection voltage $10V_i$ and the lamp terminal voltage 5V is generated in a multiplication circuit 11. The voltage $12V_w$ is proportionate to the power consumption 8 W of the lamp.

$$V_w = 2.236 \times 0.01 \cdot I \times V \quad (6)$$

This voltage $12V_w$ is muliplicated in the multiplication circuit 13 by a the following equation:

$$V_{WW} = V_W^2 \quad (7)$$

This voltage $12V_w$ is normalized in the multiplication circuit 11 so that $14V_{ww}$ which proportionate to the square of consumption power 8 W, becomes 5 volts for the rated voltage $V_o$(12V), rated electric power $W_o$(100 W), and rated current $I_o$(8.33 A) of the lamp.

The control voltage $1V_C$ and the voltage $14V_{WW}$ are compared at an error amplifier 2, and the constant voltage source unit is controlled so that this voltage differential is minimized, thereby generating the voltage 5V, which is to be applied to the lamp. At this time, the following equation is established:

$$V_C = V_{WW} \quad (8)$$

When $I \times V$, $V_W$ and $V_{WW}$ are deleted from the equations (5),(6), (7) and (8), the power consumption 8 W of the lamp for the control voltage Vc is represented as:

$$W^2 = 2000 \cdot V_C, \quad 0 \leq V_C \leq 5V \quad (9)$$

Figure 5:
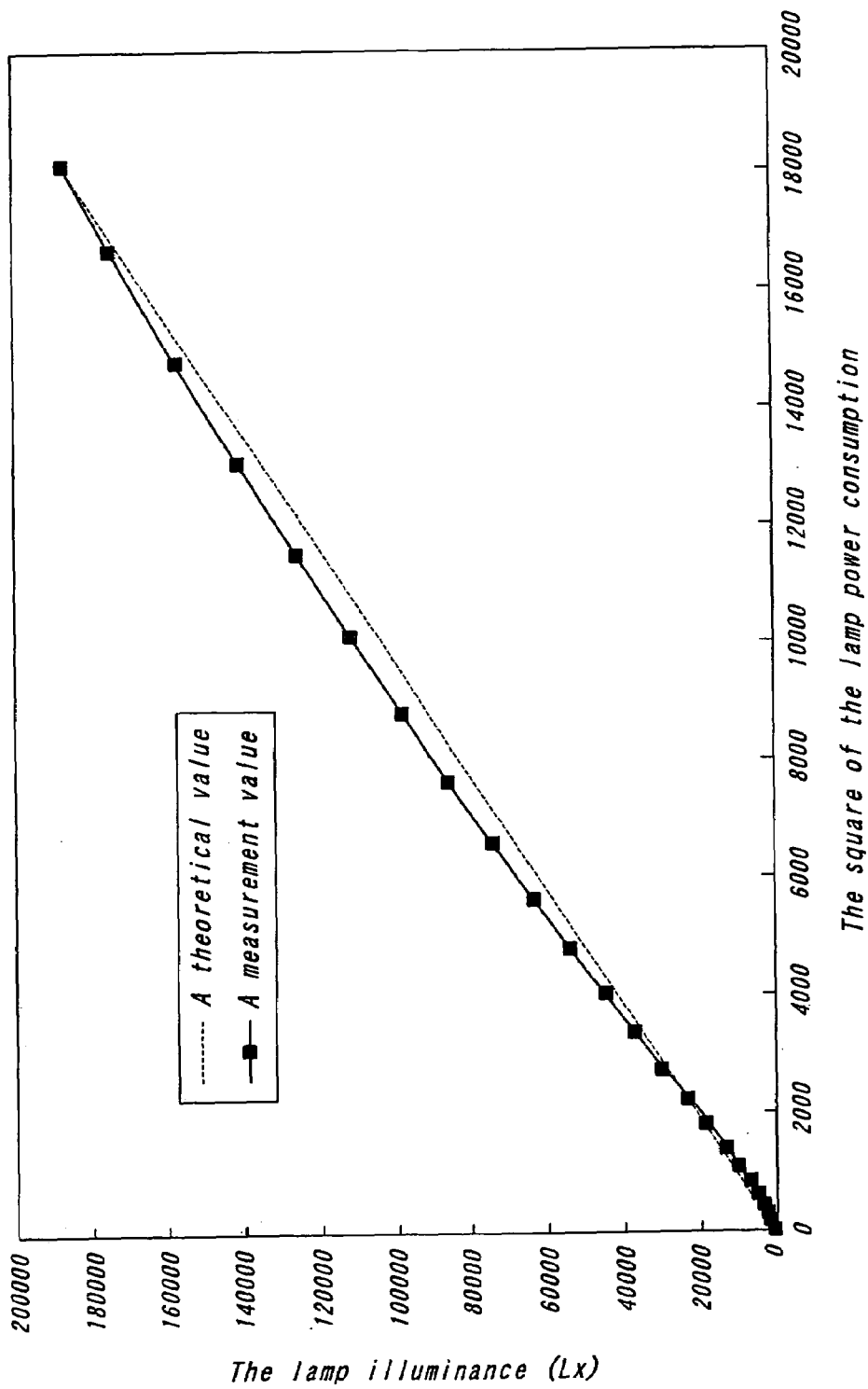
FIG. 5 is a graph showing the change in the lamp light quantity for the lamp electric power, in which the axis of abscissas shows the square of the lamp power consumption, the axis of ordinate shows the lamp illuminance (luxes or Lx), a solid line shows a measurement value, and a broken line shows a theoretical value.

Hence, by using the control circuit of the first embodiment shown in FIG. 6, the square of the power consumption 8 W of the lamp is proportionate to a value of the control voltage $1V_C$. The relationship of the emitted luminous flux 8 Lm with the power consumption 8 W of the lamp is represented by the equation (2), and it is proved that the relationship is established by the measurement data shown in FIG. 5.

Hence the equation (2) is substituted for the equation (9), Lmo of the equation (2) is taken as a rated emitted luminous flux $Lm_{100w}$ of the 100 W halogen lamp, the following equation is obtained:

$$Lm = 0.2 Lm_{100W} \times V_C, \quad 0V \leq Vc \leq 5V \quad (10)$$

so that the emitted light 8 Lm of the lamp becomes proportionate to the control voltage $V_C$.

Note that, in FIG. 6, reference numeral 15 denotes PWMC, which stands for Pulse Width Modulation Controller.

FIG. 7 is the measurement data by the halogen lamp of the rated voltage of 12V and rated power of 100 W in the control unit of the first embodiment as shown in FIG. 6. The axis of abscissas shows the control voltage $V_C$, the left axis of ordinate shows the illuminance Lx of the lamp, and the right axis of ordinate shows the applied voltage 5V of the lamp. The solid line shows the measurement data where the lamp illuminance is measured by Lx, the broken line shows the measurement data of the lamp applied voltage. and the chain line shows a theoretical value equation (11) of the change in the lamp illuminance $L_X$ for the control voltage $V_C$. From the data shown in FIG. 7, it is proved that the object is achieved within the accuracy of approximately 1.5% to approximately 6.5% in the control unit of the first embodiment shown in FIG. 6, which allows the illuminance Lx of the lamp to be proportionate to the control voltage $V_C$.

Second Embodiment

FIG. 8 shows a second embodiment of the present invention, and is a control circuit using a halogen lamp rated 150 W and 15V. A circuit constitution is almost similar to that shown in FIG. 6. The normalized constant of the multiplication circuit 11 is changed, so that a normalized constant at the rating of 150 W is given as follows:

$$V_W = 1.4907 \cdot 0.001 IV \tag{11}$$

and similarly to the preceding argument, the power consumption 8 W of the lamp for the first control voltage $1V_C$ is represented by:

$$W^2 = 4500 \cdot V_C, \ 0 \le V_C \le 5V \tag{12}$$

On the other hand, assuming that Lmo of the equation (2) is taken as a rated emitted luminous flux $Lm_{150}$, from the same argument as the preceding one, the change in the light quantity for the first control voltage $1V_C$ is represented by the following equation:

$$Lm = 0.2 Lm_{150W} \times V_C, \ 0V \le V_C \le 5V \tag{13}$$

Note that, in FIG. 8, reference numeral 15 denotes PMWC, which stands for Pulse Width Modulation Controller.

FIG. 9 shows the measurement result by the halogen lamp rated 150 W, in which the lamp voltage 5V and the lamp light quantity 8 Lx for the control voltage are measured in the circuit constitution of the second embodiment as shown in FIG. 8.

That is, the axis of abscissas shows the control voltage, the left axis of ordinate shows the lamp illuminance (luxes or Lx), and the right axis of ordinate shows the lamp voltage. The solid line shows the change in the light quantity of the lamp for the control voltage $V_C$, and the broken line shows the lamp voltage and the chain line shows a theoretical value equation (13) of the lamp light quantity for the first control voltage.

FIG. 9, which is the embodiment based on the 150 W halogen lamp, proves that though it has a slightly larger error than that of the embodiment based on the 100 W halogen lamp, the error being within approximately 4% to 8%, it achieves the object similarly.

Figure 3:
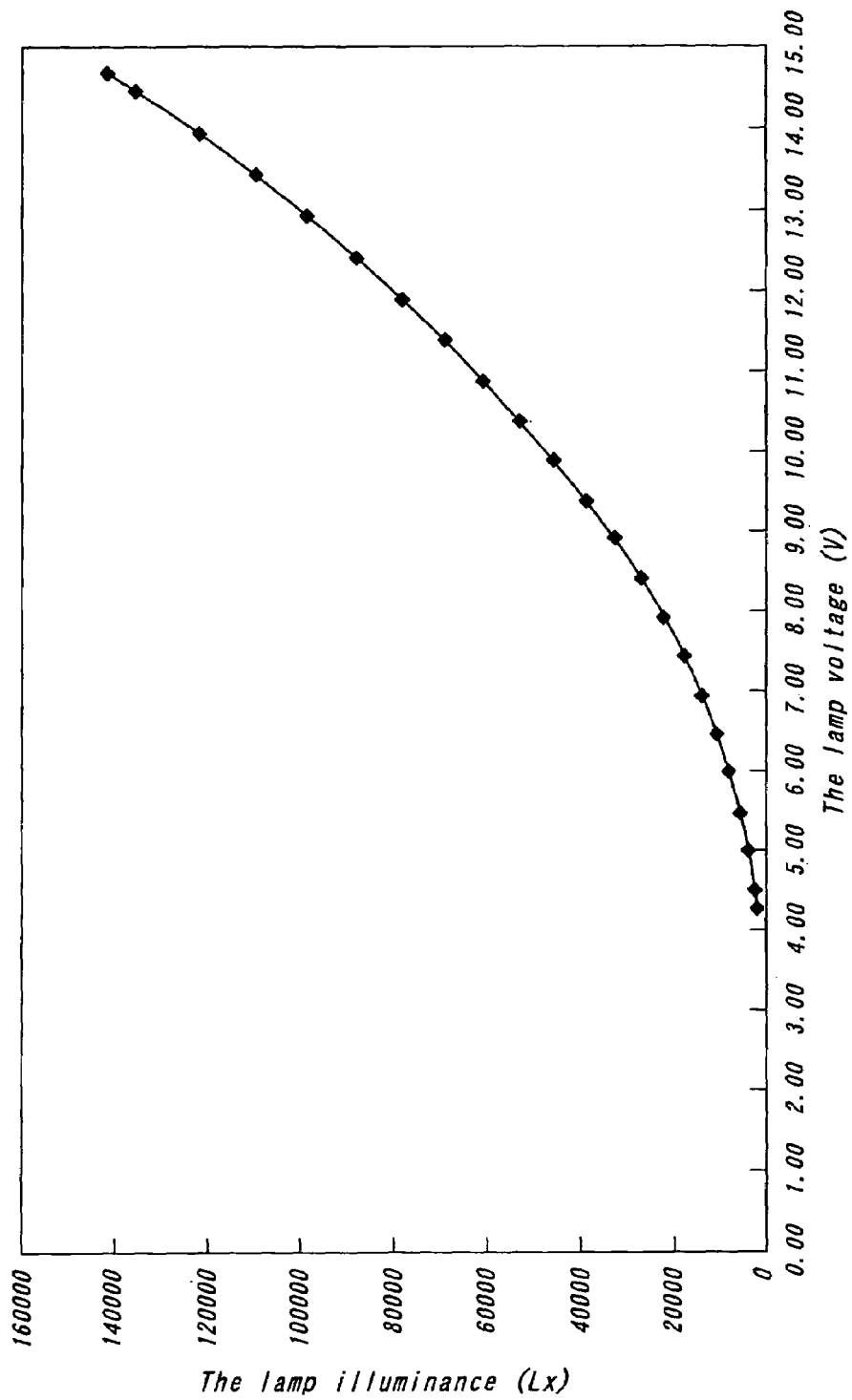
FIG. 3 is a graph showing a change in the lamp light quantity for a lamp voltage (150 W halogen lamp), in which the axis of abscissas shows a lamp voltage and the axis of ordinate shows a lamp illuminance (luxes or Lx)
Figure 4:
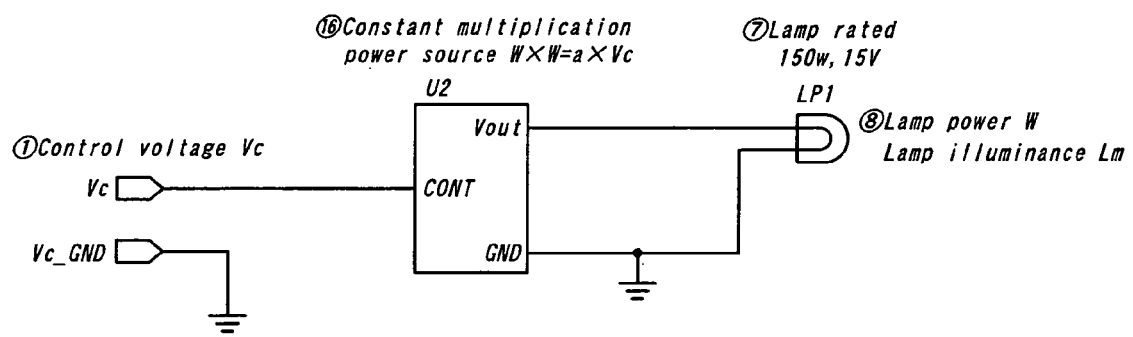
FIG. 4 is a basic principle explanatory block diagram of the present invention.

With the advancement of the image processing technology, the survey instruments and the production units based on the image processing have come to be widely used. To perform an adequate image processing with a high degree of accuracy, it is indispensable to obtain a clear-cut image of an inspection object and therefore, the control adjustment of an adequate light quantity is required. However, the change in the light quantity as shown in FIG. 3, where the light quantity is exponentially increased nonlinear-wise by the conventional lamp driving method, makes it difficult to perform the control adjustment of the adequate light quantity.

As one example of an application unit of the light source unit of the present invention, there is an illumination by a microscope that is built with a CCD, which is an image input portion of these units. As the using method thereof, there are the methods of fitting a halogen lamp to the barrel of the microscope so as to adjust the light quantity by the light quantity control unit of the present invention, or giving an adequate illumination to the inspection object through an optical fiber from the light source unit of the present invention and the like. These light quantity control units or the light source units are built into the light quantity control system of the image processing unit, and the light quantity is adjusted by the control voltage thereof. In this case, by using the light quantity control unit or the light source unit of the present invention such as seen in FIG. 7 and FIG. 9, in which the light quantity is proportionate to the control voltage, improvement of the inspection accuracy, simplification of the control system, digitalization of the control, improvement of the control speed or the like are realized as its effects.

Advantages of the Invention

By the circuit constitution of the circuit block diagram shown in FIG. 1, $W^2$ of the square of the electric power is supplied to the lamp in proportion to the control voltage $V_C$. The power consumption W of the lamp, which is controlled by this control voltage $V_C$, emits a luminous flux Lm by the emission characteristic of the physical light of the filament lamp, which is represented by the equation (2).

At this time, by the circuit constitution shown in FIG. 6, the emitted luminous flux Lm is represented by the equation (10) from the equations (2) and (9) for the halogen lamp rated 100 W, and changes almost rectilinearly.

By the circuit constitution shown in FIG. 8, the emitted luminous flux Lm is represented by the equation (13) from the equations (2) and (12) for the rated 150 W halogen lamp.

The emitted luminous flux Lm changes rectilinearly for the control voltage $V_C$ similarly to the equations (10) and (13). When an example of the measurement shown in FIG. 7 by the control unit shown in FIG. 6 of the first embodiment which drives the halogen lamp rated 100 W and the example of the measurement by the control unit shown in FIG. 8 of the second embodiment which drives the halogen lamp rated 150 W are compared for FIG. 3, which shows the change in illumination when the voltage V proportionate to a control voltage $V_c$ is supplied to the lamp, the effect of the present invention is remarkable, though there is an error in the accuracy of approximately 1.5% to approximately 6.5% in the embodiment using the 100 W halogen lamp, and approximately 4% to approximately 8% in the case of the embodiment using the 150 W halogen lamp.

What is claimed is:

1. A filament lamp light quantity control method for controlling a light quantity of a filament lamp, comprising:
   providing a current detection sensor connected in series to the filament lamp having a characteristic in which a change in a light quantity of a lamp is substantially proportionate to the square of a power consumption;
   providing a multiplication circuit for generating a voltage $V_w$ proportionate to the product of a terminal voltage V of the filament lamp and an output voltage $V_i$ of said current detection sensor;
   providing a multiplication circuit for generating a voltage $V_{WW}$ proportionate to the square of said voltage $V_w$;
   providing an error amplifier circuit for controlling an error to the minimum by comparing the output voltage $V_{WW}$ of said multiplication circuit and the control voltage $V_c$;
   providing a constant voltage source unit for supplying an electric power to the filament lamp, the unit being connected to an output terminal of the error amplifier circuit; and controlling the light quantity of the filament lamp by controlling said control voltage.

2. The filament lamp light quantity control method for controlling the light quantity of the filament lamp according to claim 1, wherein a current detection resistor R constitutes the current detection sensor.

3. A filament lamp light quantity control unit for controlling a light quantity of a filament lamp, comprising:
 a current detection sensor connected in series to the filament lamp having a characteristic in which a change in a light quantity of a lamp is substantially proportionate to the square of a power consumption;
 a multiplication circuit for generating a voltage $V_w$ proportionate to a product of a terminal voltage V of the filament lamp and an output voltage $V_i$ of said current detection sensor;
 a multiplication circuit for generating a voltage $V_{ww}$ proportionate to the square root of said voltage $V_w$;
 an error amplifier circuit for controlling an error to the minimum by comparing the output voltage $V_{ww}$ of said multiplication circuit and the control voltage Vc; and
 a constant voltage source unit for supplying an electric power to the filament lamp, the unit being connected to an output terminal of the error amplifier circuit.

4. The filament lamp light quantity control unit for controlling the light quantity of the filament lamp according to claim 3, wherein a current detection resistor R constitutes the current detection sensor.

5. A filament lamp light source unit for controlling a light quantity of a filament lamp, comprising:
 a filament lamp having a characteristic in which a light quantity of the lamp is substantially proportionate to a square of a power consumption;
 a current detection sensor connected in series to the filament lamp;
 a multiplication circuit for generating a voltage $V_w$ proportionate to the product of a terminal voltage V of the filament lamp and an output voltage $V_i$ of said current detection sensor;
 a multiplication circuit for generating a voltage $V_{ww}$ proportionate to the square of said voltage $V_w$;
 an error amplifier circuit for controlling an error to the minimum by comparing the output voltage $V_{ww}$ of said multiplication circuit and the control voltage Vc; and
 a constant voltage power source unit for supplying an electric power to the filament lamp, the unit being connected to an output terminal of the error amplifier circuit.

6. The filament lamp light source unit for controlling the light quantity of the filament lamp according to claim 5, wherein a current detection resistor R constitutes the current detection sensor.

7. The filament lamp light quantity control method according to claim 1, wherein the filament lamp is taken as a halogen lamp.

8. The filament lamp light quantity control unit according to claim 3, wherein the filament lamp is taken as the halogen lamp.

9. The filament lamp light source unit according to claim 5, wherein the filament lamp is taken as a halogen lamp.

10. The filament lamp light source unit according to claim 9, wherein the filament lamp is taken as the halogen lamp and at the same time, the current detection resistor R which constitutes the current detection sensor is taken as 0.01 Ohm.

11. A microscopic halogen lamp light source unit for controlling a light quantity of a halogen lamp, comprising:
 a current detection sensor connected in series to a lamp having a characteristic in which a change in a light quantity of a lamp is substantially proportionate to a square of a power consumption;
 a multiplication circuit for generating a voltage $V_w$ proportionate to a product of a voltage V of the lamp and an output voltage $V_i$ of said current detection sensor;
 a multiplication circuit for generating a voltage $V_{ww}$ proportionate to the square root of said voltage $V_w$;
 an error amplifier circuit for controlling an error to the minimum by comparing the output voltage $V_{ww}$ of said multiplication circuit and the control voltage Vc; and
 a constant voltage power source unit for supplying an electric power to the lamp, the unit being connected to an output terminal of the error amplifier circuit.

12. The microscopic halogen lamp light source unit for controlling the light quantity of the halogen lamp according to claim 11, wherein a current detection resistor R constitutes the current detection sensor.

* * * * *